Figure 1:
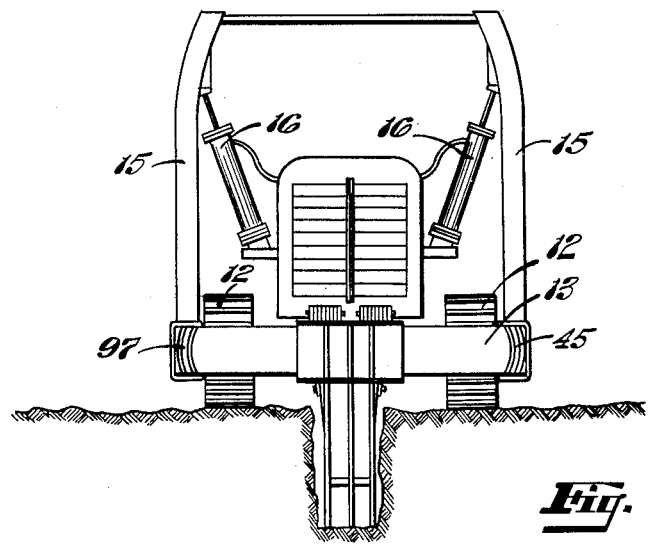

July 14, 1953  R. BOOTON ET AL  2,645,043
DITCH DIGGING ATTACHMENT FOR VEHICLES
Filed April 22, 1948  4 Sheets-Sheet 1

Inventor
Roy Booton & Gilbert C. Bower
by Kenway, Jenney, Witter & Hildreth
Attys.

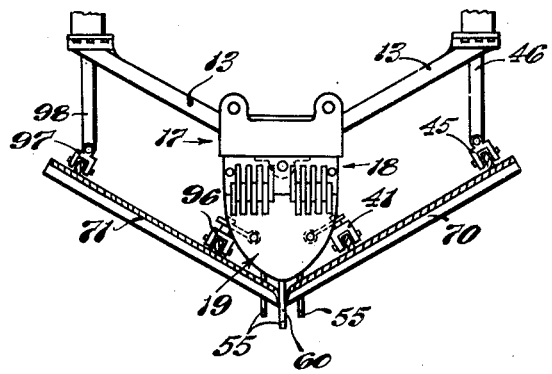
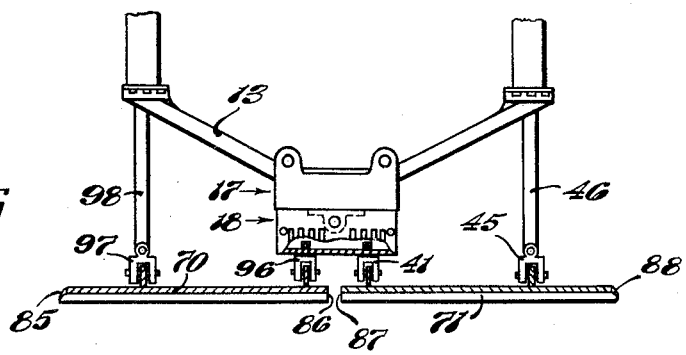
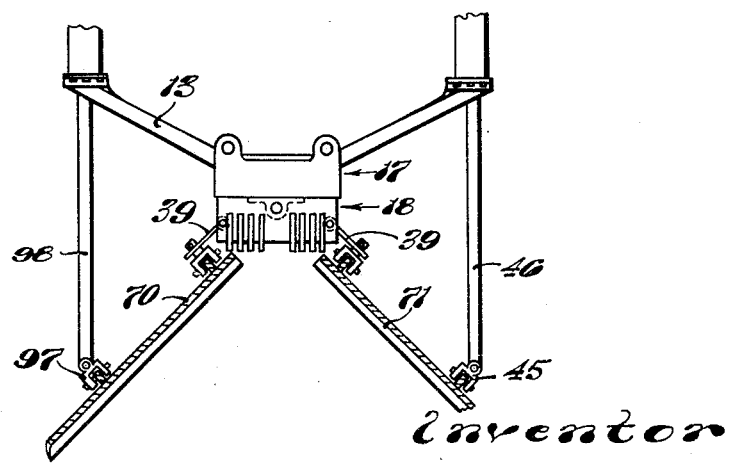

Patented July 14, 1953

2,645,043

UNITED STATES PATENT OFFICE 2,645,043

DITCH DIGGING ATTACHMENT FOR VEHICLES

Roy Booton, Dunbar, and Gilbert C. Bower, Sissonville, W. Va., assignors to Godfrey L. Cabot, Inc., Boston, Mass., a corporation of Massachusetts Application April 22, 1948, Serial No. 22,534

2 Claims. (Cl. 37—98)

Our invention relates broadly to apparatus used in handling earth and other analogous material, and more particularly to ditch digging with an attachment for the forward frame of a bulldozer, tractor or other vehicle.

In the past, mechanical ditch digging has been done in several ways. Special diggers in the nature of steam shovels have been used; scrapers or devices in the nature of the conventional plow wherein the digging mechanism trails the vehicle have been used; and bulldozers or similar vehicles have been used with digging members permanently fitted to their forward frames. The steam shovel type is difficult to maneuver, is too expensive for all but the largest contractors, and requires other mechanisms for the purpose of leveling and filling. Scrapers are not well adapted for anything but level country, and if they are designed to dig anything but a shallow trench, their size and weight render them unwieldy. Hitherto the bulldozer type equipment has either required a special design for the entire frame of the bulldozer, thereby raising the cost of the equipment and rendering reconversion to normal bulldozer operations troublesome, or has comprised a ditch digging unit alone without the benefits of associated bulldozer blade work. This latter is likewise apt to be cumbersome and expensive.

Therefore, the objects of our invention are to provide an inexpensive ditch digging attachment for the U-shaped forward frame of a tractor or other similar vehicle, to construct it so that it can readily be put to use concurrently with bulldozer operations, so to arrange the mold boards with respect to the ditch digger that earth or other matter dug up by it can be conveyed free and clear to the sides or else by a simple change can be returned to the ditch.

A further object of our invention is to provide an earth-breaking device of narrow dimensions but at the same time to have such strength as to withstand the forces normally encountered in excavating or digging ditches in a rough terrain.

A further object of our invention is to provide a ditch digging attachment for a tractor or similar vehicle that can be transported readily along with other auxiliary equipment so that ditching or similar excavating such as boulder or root moving can be accomplished without the necessity of a return to the base of operations.

To accomplish these objects, we take a pair of bulldozer mold boards which, when placed end to end, approximate the single mold board of a conventional bulldozer, between these two mold boards, we place a plow or digging member which can be either swung down into a digging position or swung clear into a vertical position above the forward frame of the bulldozer. Our supports for the mold boards are such that when the plow is up, the mold boards can be placed in the conventional position normal to the line of advance or in a position of angle diverging forward or rearward. When the plow or digging member is down and in digging position, the mold boards are secured to it and diverge towards the rear. The combination of these features of our invention allows us readily to convert from digging to filling operations, a fact of particular importance in rainy weather or conditions of thaw.

Another feature of our invention is that the support members for the mold boards and plow are constructed to allow the mold boards and plow to assume different angles of position. The result of this feature is that a vertical ditch can be dug on the side of a hill or, as the case may be, the ground level approaching the ditch can be given different angles of slope.

Another feature of our invention is a plow or ditch digging member that can be pivoted upward for the purpose of digging overhead as in a mine.

Inasmuch as a majority of the parts of our invention are made out of flat sheet metal plate, the construction of our device lends itself readily to welding, with the advantages incidental thereto. This fact in part accounts for the lightness of our device, and likewise assures sufficient strength where it is needed.

Figure 2:
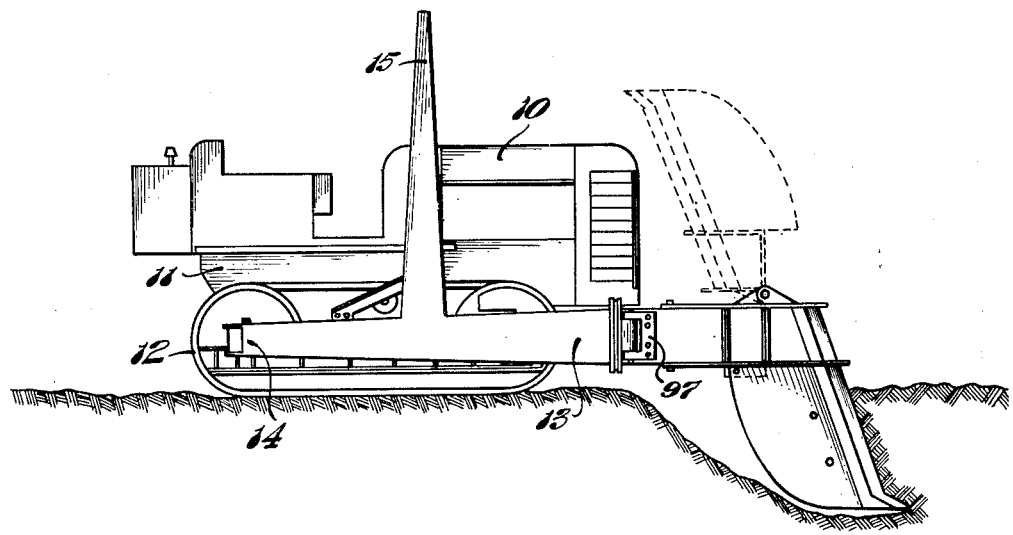
Figure 3:
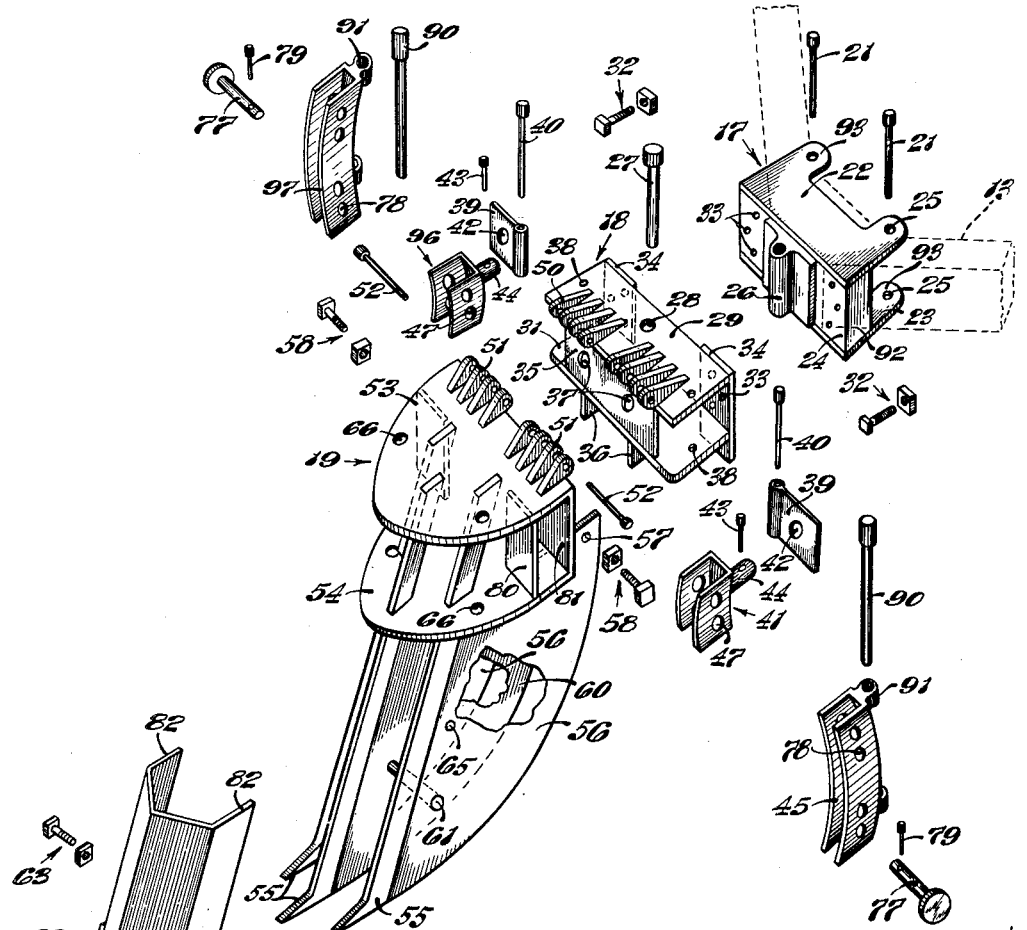
Figure 4:
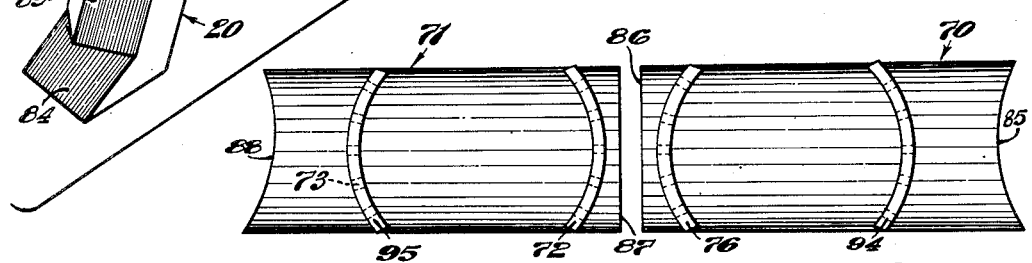
Figure 8:
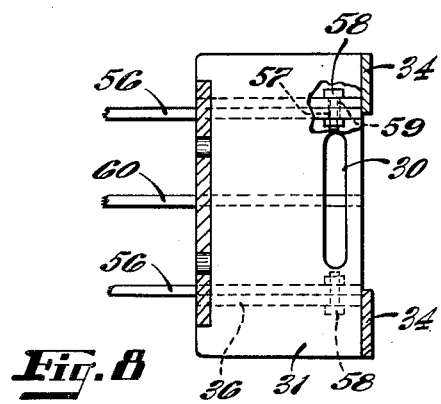
Figure 9:
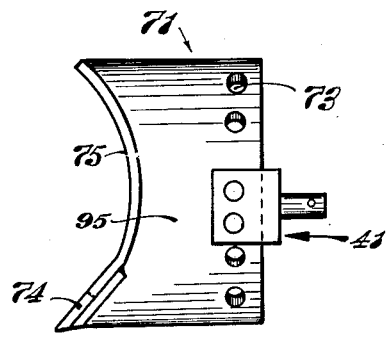
Figure 10:
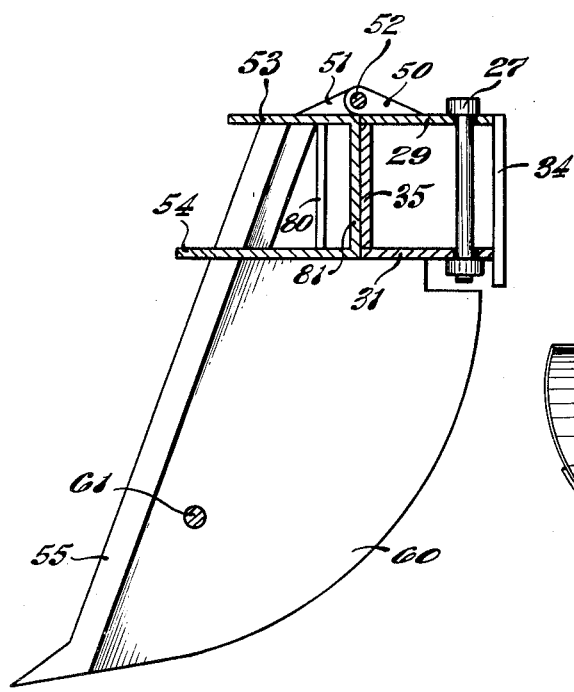
Figure 11:
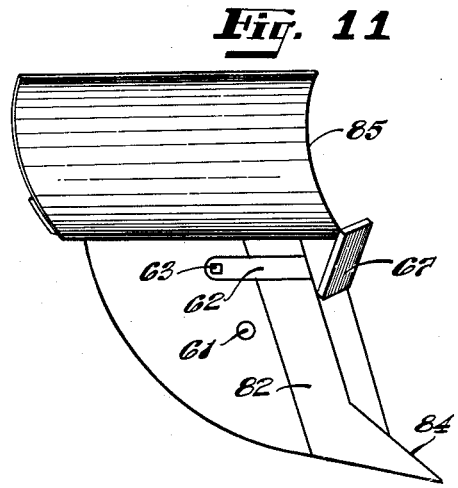

These and other features and advantages of the invention will best be understood and appreciated from the following description of a preferred embodiment thereof, selected for purposes of illustration and shown in the accompanying drawings in which:

Fig. 1 is a view of the complete device in front elevation without mold boards attached, Fig. 2 is a view in side elevation without mold boards attached, Fig. 3 is a view in perspective of the individual component parts of the plow member deployed in relation to their assembled positions, Fig. 4 is a view in rear elevation of the mold boards in position for conventional bulldozer operations, Fig. 5 is a plan view with members arranged for digging, Fig. 6 is a plan view with members arranged for conventional bulldozer operations, Fig. 7 is a plan view with members arranged for back-filling operations, Fig. 8 is a plan view of the bottom plate of the intermediate support member, Fig. 9 is a view in side elevation of a mold board, Fig. 10 is a view in side elevation of the center plow member, and Fig. 11 is a view in side elevation with members arranged for digging.

In the preferred embodiment of our invention, we use a conventional tractor 10, comprising a chassis 11, and a caterpillar tread 12. A U-shaped frame 13 is pivotally mounted on the rear axle 14 of the tractor 10 and supported by arms 15. Hydraulic means 16 serve to raise or lower the frame 13. Arms 46 and 98 extend forward from the sides of the frame 13.

The digging attachment comprises four basic parts; a base 17, an intermediate supporting frame 18, a plow 19, and a shovel 20. The base member 17 comprises an upper plate 22, a lower plate 23, a forward wall 24, and side walls 92, welded together substantially as appears in Fig. 3. Upper and lower plates 22 and 23 are provided with rear flanges 93 in which are located holes 25 through which pass a pair of locking pins 21 to secure the base member 17 to the forward U-shaped frame 13. A flanged socket member 26 is welded to the forward wall 24 of the base member 17.

The intermediate supporting frame 18 comprises an upper plate 29, a bottom plate 31, rear walls 34, a forward wall 35, and bottom flanges 36 all welded together substantially as appears in Fig. 3. A hole 28 is located centrally and toward the rear of the plate 29. A slot 30 seen in Fig. 8 is located centrally and toward the rear of the bottom plate 31. The pin 27 passes through the hole 28, thence through the flanged socket 26, and finally through the slot 30, securing the intermediate supporting frame 18 to the base member. The rear walls 34 of intermediate supporting frame 18 are provided with holes 33, as is the forward wall 24 of the base 17. The said holes 33 are located in an arc about the transverse pivot axis of the intermediate supporting frame 18 and are equidistant from each other on the said arc such that when the intermediate supporting frame is given different angles of attitude, the bolts 32 can be inserted in the holes 33 for the purpose of securing it in any one of several positions. The plates 29 and 31 are also provided with holes 38 located centrally at each end, and the forward wall 35 is provided with holes 37 located in transverse alignment. The holes 37 and 38 are used for supporting the mold boards as will be explained presently.

The plow 19 comprises an upper plate 53, a lower plate 54, rear walls 81, intermediate walls 80, plow blade leading edges 55, side plow blades 56, a center plow blade 60, and a transverse support bar 61, all welded together substantially as appears in Fig. 3. Hinges 50 and 51 are welded to the upper plate 29 of intermediate supporting frame 18 and the upper plate 53 of the plow 19 respectively. The hinges 50 and 51 serve to connect the plow 19 to the intermediate supporting frame 18, being held by pins 52. The side plow plates 56 are provided with holes 57 which communicate with the holes 59 of the bottom flanges 36 of intermediate supporting frame 18 when the plow is in lowered position. Bolts 58 pass through the said holes 57 and 59 further securing the plow 19 to the intermediate supporting frame 18. The center plow blade 60 is notched at the upper end of its trailing edge as seen in Fig. 10 to provide room for the lower end of the pin 27 to pass by it unobstructed. The side plow plates 56 are provided with holes 65 used in securing the shovel 20 to the plow 19. Also the upper plate 53 and lower plate 54 are provided with holes 66 used for supporting the mold boards as will be explained presently.

The shovel 20 comprises side walls 82, front walls 83, a scooping surface 84 extending forward from the lower end of the front walls 83, a flange 67 projecting forward from the said front walls 83, and flanges 62 all welded together substantially as appears in Fig. 3. The flanges 62 are provided with holes 64 which communicate with holes 65 of the plow side plates 56. Bolts 63 pass through the said holes 64 and 65 securing the said shovel 20 to the plow 19.

Attached to the digging device are mold boards 70 and 71 in any one of three positions, see Figs. 5, 6 and 7. The mold boards 70 and 71 represent right and left hand members respectively as viewed from the rear arranged for conventional digging operations as in Fig. 4. The mold board wall 75 is curved in the manner of the conventional snow plow, and is provided with a reinforced cutting edge 74. Thus, as illustrated, the mold boards 70 and 71 may be flared backwardly as shown in Fig. 5 to cast earth aside, be positioned perpendicular to the line of advance as shown in Fig. 6 for conventional bulldozing operations or be flared forwardly as shown in Fig. 7 to act as scoop as desired. Mold board 70 is provided with right flange 94 and the left flange 76 welded to its rear surface (see Figs. 4 and 5). Likewise, the mold board 71 has the right flange 95 (see Figs. 3, 4 and 5) and the left flange 72 welded to its rear surface. The flanges 72, 76, 94 and 95 are provided with vertically disposed holes 73.

The supporting connection between the mold boards and digging members comprises outer double flange members 45 and 97, inner double flange members 41 and 96, and hinges 39. The inner double flange members are provided with holes 47, and the outer double flange members are provided with holes 78. The inner double flange members are provided with rear pins 44 welded to them and retaining pins 43, and the outer double flange members are provided with hinge sockets 91 and pins 90. The hinge members 39 are perforated by holes 42 and are provided with pins 40. The pins 77 are used to secure the double flange members to the flanges 72, 76, 94 and 95 of the mold boards. This is done by passing pins 77 through the holes 78 and 47 as the case may be, then through holes 73 of the mold board flanges, and again through holes 78 or 47 on the other side of the double flange member. Once through, the pins 79 are inserted to retain the pins 77.

To assemble my device for digging operations (see Fig. 5), the plow 19 is lowered and secured to flanges 36 by bolts 58. The mold board 70 is placed on the left hand side. The double flange member 41 is secured to the flange 94 by a pin 77 through the appropriate hole 73 of the flange 94 and the holes 47 of the said double flange. The outer double flange member 45 is then secured to the mold board flange 76 similarly. The pin 44 of the double flange member 41 is then inserted in the hole 42 of the hinge 39. The hinge 39 is then secured to the plow 19 by the pin 40 passing through the holes 66 and the said hinge member 39. The pin 90 is then inserted in the sockets 91 and through the end of the arm 46. The mold board 71 is placed on the right hand side and mounted in a corresponding way with the flange 95 connecting to the double flange member 96, etc. The shovel 20 is then bolted to plow 19 by the bolts 63 through the holes 64 and 65. In this position the flange 67 stands in front of the lower tips of the mold board ends 85 and 88 and serves to protect them.

To assemble our device for conventional bulldozer operations (Fig. 6), the plow 19 is swung clear to the top, the mold boards are reversed with mold board 70 placed to the right and 71 to the left. In this arrangement the hinges 39 are not used, the pins 44 simply being inserted in the holes 37 of the forward wall 35 of intermediate supporting frame 18. The flange 94 is connected to the double flange support member 97, and the flange 95 is connected to the double flange support member 45.

For back-filling operations (Fig. 7) the hinges again are used being secured to the intermediate supporting frame 18 by the pins 40 through the holes 38. Otherwise the arrangement is the same as for conventional operations except for the angle of divergence forward, as is evident from Figs. 5, 6 and 7.

It will be obvious to those skilled in the art that modifications of this preferred embodiment of our invention can be made without departing from the spirit of the invention as defined in the appended claims.

Having thus disclosed our invention, what we claim as new and desire to secure by Letters Patent of the United States is:

1. A ditch digging device for attachment to a vehicle, having in combination a supporting frame, a base member connected thereto, means for moving said supporting frame vertically, a vertical plow member, mold boards operatively associated with the said plow member, supporting members for the said mold boards as follows, one pivotally connected to each side of the said base member, one pivotally connected to each side of said plow member, and one pivotally connected to each outward lateral extremity of the said supporting frame, perforated flange members connected to said mold boards, perforated flange members connected to said supporting members, means for interlocking said supporting member flanges to said mold board flanges in a plurality of positions, and means for varying the position of the lateral support members from forwardly to rearwardly along the line of advance.

2. A ditch digging device for attachment to the forward frame of a vehicle having in combination, a plow member, an intermediate supporting member for said plow member connected to said forward frame, said plow member being pivotally connected to said intermediate supporting member; mold boards; means including pivotally mounted hinges connecting said mold boards to said plow member in a rearwardly diverging position when the plow member is pivoted fully downward relative to said intermediate supporting member, and connecting said mold boards to said intermediate supporting member in a normal to forwardly diverging position when said plow member is pivoted fully upward clear of said intermediate supporting member; and means including spaced bolts in circular arrangement connecting said intermediate supporting member to said frame in a plurality of attitudes relative to the horizontal.

ROY BOOTON.
GILBERT C. BOWER.

References Cited in the file of this patent

UNITED STATES PATENTS

| Number | Name | Date |
|---|---|---|
| 1,194,166 | Gaines | Aug. 8, 1916 |
| 1,358,836 | Francis | Nov. 16, 1920 |
| 2,190,056 | Davidson | Feb. 13, 1940 |
| 2,230,704 | Sorensen | Feb. 4, 1941 |
| 2,235,913 | Beane | Mar. 25, 1941 |
| 2,309,223 | Staring | Jan. 26, 1943 |
| 2,358,495 | Pace | Sept. 19, 1944 |
| 2,364,657 | Proctor et al. | Dec. 12, 1944 |
| 2,420,027 | Austin | May 6, 1947 |
| 2,452,408 | Washbond | Oct. 26, 1948 |